US008565506B2

(12) United States Patent
Marshall et al.

(10) Patent No.: US 8,565,506 B2
(45) Date of Patent: Oct. 22, 2013

(54) INTEGRATING AUXILIARY DETECTION AND VOTING ALGORITHMS INTO CLINICAL CAD WORKFLOW

(75) Inventors: Julian Marshall, Los Altos, CA (US); Kevin A. Kreeger, Sunnyvale, CA (US)

(73) Assignee: Hologic, Inc., Marlborough, MA (US)

( * ) Notice: Subject to any disclaimer, the term of this patent is extended or adjusted under 35 U.S.C. 154(b) by 380 days.

(21) Appl. No.: 12/916,478

(22) Filed: Oct. 29, 2010

(65) Prior Publication Data

US 2011/0103675 A1    May 5, 2011

Related U.S. Application Data

(60) Provisional application No. 61/256,928, filed on Oct. 30, 2009.

(51) Int. Cl.
*G06K 9/00*    (2006.01)

(52) U.S. Cl.
USPC ........................................................ 382/132

(58) Field of Classification Search
None
See application file for complete search history.

(56) References Cited

U.S. PATENT DOCUMENTS

| 2004/0252871 | A1* | 12/2004 | Tecotzky et al. | 382/128 |
| 2007/0286466 | A1* | 12/2007 | Heffernan et al. | 382/128 |
| 2009/0136113 | A1* | 5/2009 | Chan et al. | 382/132 |

OTHER PUBLICATIONS

Warrent et al., "MammoGrid—a prototype distributed mammographic database for Europe", Nov. 2007, Clinical Radiology, vol. 62, iss. 11, p. 1044-1051.*

* cited by examiner

*Primary Examiner* — Stephen R Koziol
*Assistant Examiner* — Timothy Choi
(74) *Attorney, Agent, or Firm* — Vista IP Law Group LLP

(57) ABSTRACT

Methods, systems, and related computer program products for computer-aided detection (CAD) of anatomical abnormalities in medical images are described. A preexisting CAD environment includes a review workstation and a primary CAD processor programmed with a primary CAD algorithm. Installed into the preexisting CAD environment is an auxiliary processing system programmed to receive a first CAD report from the primary CAD processor, apply an auxiliary CAD algorithm that is independent of the primary CAD algorithm to the underlying medical image, apply a voting algorithm to the primary and auxiliary CAD findings, and generate a second CAD report that includes the voting results. The second CAD report is configured to result in a rendering by the review workstation that is highly similar to a rendering that would result from the first CAD report except that the voted CAD findings are substituted in place of the primary CAD findings.

20 Claims, 4 Drawing Sheets

INTEGRATING AUXILIARY DETECTION AND VOTING ALGORITHMS INTO CLINICAL CAD WORKFLOW

CROSS-REFERENCE TO RELATED APPLICATIONS

This application claims the benefit of U.S. Provisional Patent Application Ser. No. 61/256,928, filed Oct. 30, 2009, entitled "Integrating Auxiliary Detection And Voting Algorithms Into Clinical CAD Workflow," which is incorporated by reference herein. The subject matter of one or more preferred embodiments described herein also relates to the subject matter of the following commonly assigned applications, each of which is incorporated by reference herein: U.S. Provisional Application Ser. No. 60/989,917, filed Nov. 23, 2007; and U.S. Ser. No. 12/276,300, filed Nov. 21, 2008, now published as US 2009/0136113A1 having a publication date of May 28, 2009, issued as U.S. Pat. No. 8,175,367 on May 8, 2012.

FIELD

This patent specification relates to medical imaging. More particularly, this patent specification relates to the computer-aided detection (CAD) of anatomical abnormalities in medical imaging, with one particularly advantageous application being in an x-ray mammography CAD environment.

BACKGROUND

Computer-aided detection (CAD) refers to the use of computers to analyze medical images to detect anatomical abnormalities therein. Sometimes used interchangeably with the term computer-aided detection are the terms computer-aided diagnosis, computer-assisted diagnosis, or computer-assisted detection. The outputs of CAD systems are sets of information sufficient to communicate the locations of anatomical abnormalities, or lesions, in a medical image, and can also include other information such as the type of lesion, degree of suspiciousness, and the like. Such CAD detections are most often communicated in the form of graphical annotations overlaid upon diagnostic-quality and/or reduced-resolution versions of the medical image. CAD results are mainly used by radiologists as "secondary reads" or secondary diagnosis tools. Some CAD implementations, however, have used CAD results in a "concurrent reading" context in which the radiologists look at the CAD results at the same time that they look at the images.

While CAD algorithms have been proposed and developed for a variety of different medical imaging modalities, much of the pioneering development in CAD technology was performed for the particular modality of x-ray mammography. X-ray mammography CAD systems are described, for example, in U.S. Pat. No. 5,729,620, U.S. Pat. No. 5,815,591, U.S. Pat. No. 5,917,929, U.S. Pat. No. 6,014,452, U.S. Pat. No. 6,075,879, U.S. Pat. No. 6,301,378, U.S. Pat. No. 6,574,357, and U.S. Pat. No. 6,909,795, each of which is incorporated by reference herein. Thousands of CAD systems for x-ray mammography are now installed worldwide, and are used to assist radiologists in the interpretation of millions of mammograms per year. Substantial effort and attention has been directed to improving the performance capabilities of CAD systems, such as x-ray mammography CAD systems. As known in the art, the performance of a CAD system can be characterized in terms of the interplay between its sensitivity (true positive rate) and specificity (true negative rate) as expressed, for example, in a free receiver operating characteristic (FROC) curve that plots system sensitivity versus the number of false marks per case. Higher performance, more effective CAD systems are characterized by a higher FROC curve, meaning that for any particular operating point at which the CAD system exhibits a particular number of false marks per case, there is a higher sensitivity, and, conversely, that for any particular operating point at which the CAD system exhibits a particular sensitivity, there is a lower number of false marks per case. The operating point at which a CAD system operates along its FROC curve is usually set by an internal numerical threshold that dictates how suspicious a particular finding must be, in terms of a computed internal numerical probability metric, in order to qualify as a "marked" finding on the user display. Although the operating point is often user-adjustable in modern CAD systems, which allows the user to choose their own desired trade-off point along the FROC curve, the actual FROC curve itself is fixed for any particular CAD system, and serves as an indication of the overall effectiveness of that CAD system.

One known method for improving the effectiveness of a CAD system is described in U.S. Pat. No. 6,067,372 to Gur, et. al. (hereinafter "Gur"), which is incorporated by reference herein, and involves processing each medical image using two or more independent CAD algorithms to generate two or more sets of CAD detections, followed by applying a statistical computation process to the two or more sets of CAD detections to generate a final set of CAD detections. An experiment is described in Gur in which 428 images having 220 verified masses were separately processed using two independent CAD schemes, with the results being combined using different statistical methods (ANDing and ORing), and in either case it was found that the combined technique provided significant improvement over either CAD method alone. Although not universally applied, the term "voting" is often used in the literature to describe the statistical computation process to the two or more sets of CAD detections. The use of voting in mammography processing is also described in US 2009/0129656A1, which is incorporated by reference herein.

As used herein, two CAD algorithms are termed independent if their separate application to the same image, or to the same population of images, yields at least one finding that appears differently in the two CAD result sets, either in a "binary" sense (marker on/marker off) or an "analog" sense (different internal probability metric). The particular extent to which two CAD algorithms are independent can vary from a high degree of independence, in which case the term "orthogonal" might more specifically characterize their relationship, to a low degree of independence, in which case the term "uncorrelated" or "partially uncorrelated" might more specifically characterize their relationship. By way of example, a relatively high degree of independence would probably be present if the two CAD algorithms were conceived, designed, and coded by two different teams of researchers located in different states or countries. In contrast, a relatively low degree of independence would probably be present if the two CAD algorithms were based on a common set of starting code, but were differently "tweaked" relative to certain feature computations, internal parameters, internal image filtering algorithms, and the like.

By way of example, as the term independent is used herein, the commonly assigned US 2009/0136113A1, supra, represents an example of the use of multiple independent CAD algorithms and a voting process. In US 2009/0136113A1, there is disclosed a common "foundational" CAD algorithm that is characterized by at least one of non-shift-invariance (i.e., the findings can at least partially change if the input image is shifted), non-rotational-invariance (i.e., the findings can at least partially change if the input image is rotated), and non-inversional-invariance (i.e., the findings can at least partially change if the input image is flipped). The foundational CAD algorithm is applied separately to differently shifted, rotated, and/or inverted versions of the same medical image, and the different CAD result sets voted upon to determine a final CAD result set. As the term independent is used herein, each application of such foundational CAD algorithm to the differently shifted, rotated, and/or inverted versions of the same medical image represents an instance of an independent CAD algorithm. By way of further example, Gur, supra, describes embodiments in which the same CAD algorithm is re-applied to a same medical image after different amounts of noise are added to that image, or the image is redigitized, and then a statistical computation (i.e., voting) process is applied to the different result sets to generate a final decision for each finding. As the term independent is used herein, each application of the CAD algorithm to a differently noise-perturbed or redigitized version of the same medical image represents an instance of an independent CAD algorithm.

Although the use of multiple independent CAD algorithms and voting processes has been proposed, issues arise in the practical application of this concept to improve the performance of CAD systems in practical clinical environments. Such issues are especially pronounced in the field of x-ray mammography CAD, in which case there is a large installed base of x-ray mammography CAD systems in clinics around the world around which different clinical practices, procedures, and expectations have been established. It would be desirable to harness the advantages of using multiple independent CAD algorithms and voting processes in a way that does not require an en masse deconstruction and reconstruction of systems and processes that would otherwise be associated with such a large paradigm shift. It would be desirable to integrate the use of multiple independent CAD algorithms and voting processes into the existing x-ray mammography CAD infrastructure in a way that does not upset the established clinical practices, procedures, and expectations that have already been developed, both in terms of the technology institutions that have shaped the current CAD landscape and the real-world clinical environments that have used CAD technology to save lives. Similar CAD-related issues exist for medical imaging modalities other than x-ray mammography, and still other issues arise as would be apparent to a person skilled in the art in view of the present disclosure.

SUMMARY

Provided in accordance with the preferred embodiments are methods, systems, and related computer program products for computer-aided detection (CAD) of anatomical abnormalities in medical images based on a modification of a preexisting CAD environment, the preexisting CAD environment including (i) a primary CAD processing system programmed to apply a primary CAD algorithm to medical images to generate CAD reports of a preexisting format, and (ii) a review workstation configured to receive the CAD reports of the preexisting format and render their contents for display in conjunction with the associated medical images. An auxiliary processing system is installed into the preexisting CAD environment. The auxiliary processing system includes at least one processor and is programmed to carry out (i) at least one auxiliary CAD algorithm that is independent of the primary CAD algorithm, and (ii) a CAD voting algorithm. The auxiliary processing system receives a first medical image and a first CAD report, the first CAD report having the preexisting format and incorporating a primary set of CAD findings generated by the primary CAD processing system based upon application of the primary CAD algorithm to the first medical image. The auxiliary processing system processes the first medical image according to the at least one auxiliary CAD algorithm to respectively generate at least one auxiliary set of CAD findings. The auxiliary processing system then processes the primary set of CAD findings in conjunction with the at least one auxiliary set of CAD findings according to the CAD voting algorithm to generate a voted set of CAD findings. The auxiliary processing system then generates a second CAD report, the second CAD report having the preexisting format, wherein the second CAD report is configured to result in a rendering by the review workstation that is highly similar to a rendering that would result from the first CAD report except that the voted set of CAD findings are substituted in place of the primary set of CAD findings. The second CAD report is then forwarded for rendering and display by the review workstation in conjunction with the first medical image.

Also provided is an apparatus for facilitating CAD detection of anatomical abnormalities in medical images in a CAD environment, the CAD environment including a primary CAD processing system programmed to apply a primary CAD algorithm to medical images to generate CAD reports of a preexisting format, the CAD environment further including a review workstation configured to receive the CAD reports of the preexisting format and render their contents for display in conjunction with the associated medical images.

Also provided is a method for CAD detection of anatomical abnormalities in x-ray mammograms based on modification of a preexisting x-ray mammography CAD environment, the preexisting x-ray mammography CAD environment including (i) a primary CAD processing system programmed to apply a primary CAD algorithm to x-ray mammograms to generate DICOM Mammography CAD Structured Report Information Object Instances (SR-IOIs) associated therewith, and (ii) a review workstation configured to receive the DICOM Mammography CAD SR-IOIs and render their contents for display in conjunction with the associated x-ray mammograms. The method comprises installing into the preexisting x-ray mammography CAD environment an auxiliary processing system in operative data communication with the primary CAD processing system and the review workstation, the auxiliary processing system including at least one processor and being programmed to carry out (i) at least one auxiliary CAD algorithm that is independent of the primary CAD algorithm, and (ii) a CAD voting algorithm. The method further comprises receiving, at the auxiliary processing system, a first x-ray mammogram and a first DICOM Mammography CAD SR-IOI incorporating a primary set of CAD findings generated by the primary CAD processing system based upon application of the primary CAD algorithm to the first x-ray mammogram. The method further comprises processing, by the auxiliary processing system, the first x-ray mammogram according to the at least one auxiliary CAD algorithm to respectively generate at least one auxiliary set of CAD findings, processing the primary set of CAD findings in conjunction with the at least one auxiliary set of CAD findings according to the CAD voting algorithm to generate a voted set of CAD findings, and generating a second DICOM Mammography CAD SR-IOI incorporating the voted set of CAD findings. The method further comprises receiving, at the review workstation, the second DICOM Mammography CAD SR-IOI and rendering the contents thereof for display in conjunction with the first x-ray mammogram.

DETAILED DESCRIPTION

Figure 1:
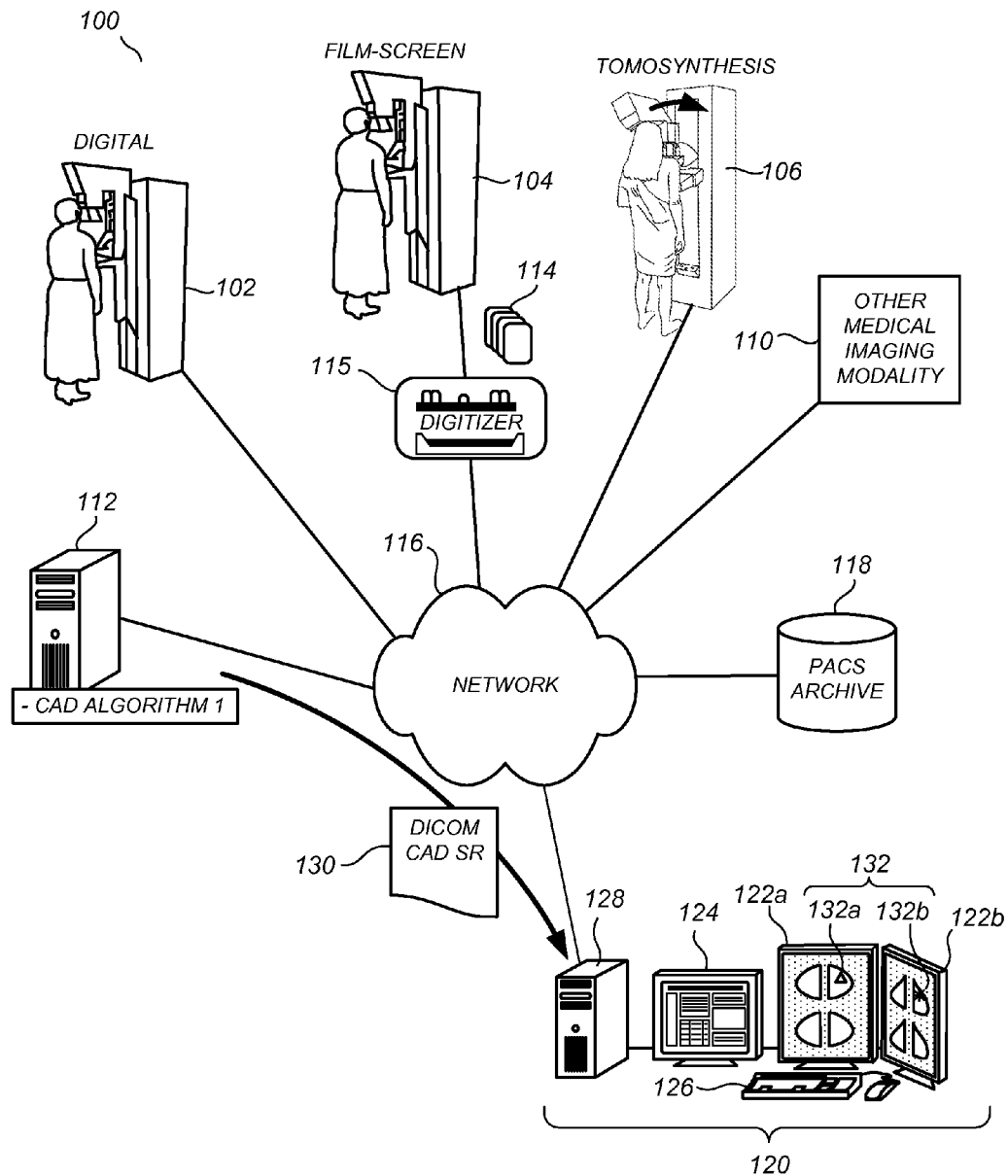
FIG. 1 illustrates a conceptual diagram of a medical imaging CAD environment according to the prior art.

Provided in accordance with the preferred embodiments are methods, systems, and related computer program products for improving the effectiveness of computer-aided detection (CAD) of anatomical abnormalities in medical images. In view of the pervasiveness of x-ray mammography CAD, including a large installed base of x-ray mammography CAD systems in a variety of clinical environments, the preferred embodiments described further hereinbelow are particularly advantageous in the context of x-ray mammography CAD, and one or more of the preferred embodiments is described hereinbelow in the context of an x-ray mammography CAD environment. However, it is to be appreciated that the scope of the present disclosure is not limited to x-ray mammography CAD environments, and that the features and advantages of the preferred embodiments infra are readily applicable to a variety of CAD environments built around various present or prospective medical imaging modalities (e.g., CT, MRI, PET, SPECT, ultrasound, x-ray tomosynthesis, thermography, electrical conductivity-based modalities, etc.) for a variety of different body parts (e.g., head, neck, chest, abdomen, etc.). As would be appreciated by a reader skilled in the art, while certain preferred embodiments may be drawn or described in the context of "an x-ray mammogram" for clarity of presentation, such descriptions are representative of the treatment of the several multiple mammogram image views that make up an x-ray mammogram case. Thus, for example, where "an x-ray mammogram" may be mentioned hereinbelow as being analyzed by a CAD system, or transferred from one network node to another, or having associated CAD results voted upon, it is to be appreciated that there may be several images (several x-ray mammogram image views) associated with that x-ray mammogram to which such operations are being applied. In the United States, for example, it is common for most x-ray mammograms to comprise four x-ray mammogram image views, including LCC (left craniocaudal), RCC (right craniocaudal), LMLO (left mediolateral oblique), and RMLO (right mediolateral oblique).

One or more of the preferred embodiments is directed to improving the effectiveness of CAD detection in an x-ray mammography environment as provided by a primary CAD system, the primary CAD system being based on a primary CAD algorithm and being capable of generating DICOM Mammography CAD Structured Report Information Object Instances (CAD SR-IOIs). The x-ray mammography environment includes a review workstation that is capable of receiving DICOM Mammography CAD SR-IOIs and rendering the CAD-computed information therein for display in conjunction with an associated underlying x-ray mammogram image(s). The primary CAD system and the review workstation are mutually configured according to an established clinical dataflow for that x-ray mammography environment.

According to one preferred embodiment, an auxiliary CAD processing and voting unit (ACPV unit) is provided to the x-ray mammography environment and electronically coupled, either directly or indirectly, such as by virtue of a data network or other data communication method, to both the primary CAD system and the review workstation. After an image acquisition procedure, an x-ray mammogram that is destined for CAD processing is transferred in digital form to both the primary CAD system and the ACPV unit. The primary CAD system processes the x-ray mammogram according to the primary CAD algorithm to generate a primary set of CAD findings. The primary CAD system further generates a first DICOM Mammography CAD SR-IOI in accordance with the established clinical dataflow for that x-ray mammography environment, the first DICOM Mammography CAD SR-IOI including the primary set of CAD findings embedded therein in a predetermined section thereof according to a predetermined finding coding format. The first DICOM Mammography CAD SR-IOI is then electronically transferred to the ACPV unit.

The ACPV unit comprises one or more CAD processors configured to process the received x-ray mammogram according to one or more auxiliary CAD algorithms, each auxiliary CAD algorithm being independent of the other auxiliary CAD algorithms and independent of the primary CAD algorithm, wherein one or more auxiliary sets of CAD findings are generated. The ACPV unit further comprises one or more translation processors configured to extract the primary set of CAD findings from the first DICOM Mammography CAD SR-IOI, and to translate the primary set of CAD findings and each auxiliary set of CAD findings into a format sufficiently common so that a voting algorithm can be applied to the multiple sets of CAD findings. The ACPV unit further comprises one or more voting processors configured to apply a voting algorithm to the multiple sets of CAD findings and to generate therefrom a single, final set of CAD findings, termed herein a voted set of CAD findings. The translation processor of the ACPV unit then generates a second DICOM Mammography CAD SR-IOI based on the first DICOM Mammography CAD SR-IOI and the voted set of CAD findings, wherein the second DICOM Mammography CAD SR-IOI consists essentially of the first DICOM Mammography CAD SR-IOI, except that the first set of CAD findings is replaced by the voted set of CAD findings, i.e., it is the voted set of CAD findings that is encoded into the predetermined section of the DICOM Mammography CAD SR-IOI according to the predetermined finding coding format.

According to one preferred embodiment, the ACPV unit is provided as a single, standalone piece of electronic processing hardware, with associated programming to implement the CAD processing, translation, and voting processes described above. In other preferred embodiments, the functionalities of the ACPV unit can be separated into multiple different hardware units, such as a first group of one or more hardware boxes to implement each respective CAD algorithm, a second group of one or more hardware boxes to implement the voting algorithm, a third group of one or more hardware boxes to implement data translation functions, and so forth. The various hardware boxes for the ACPV unit can be (i) located together in the same room or building, (ii) distributed across different buildings, cities, or countries, (iii) provided from a single remote location according to an ASP (application service provider) model, or (iv) provided according to a cloud computing model, etc., all such possibilities being within the scope of the preferred embodiments.

According to one preferred embodiment, during the creation of the second DICOM Mammography CAD SR-IOI by the ACPV unit, aspects of the first DICOM Mammography CAD SR-IOI that are not intrinsically linked to the locations, probabilities, and other descriptors of the abnormality findings are left substantially undisturbed in the second DICOM Mammography CAD SR-IOI. These undisturbed aspects are often associated with the mutual configuration of the primary CAD system and the review workstation according to an established clinical dataflow that existed prior to the introduction of the ACPV unit into the x-ray mammography environment. These undisturbed aspects preferably include information that will dictate the look and feel of the rendered CAD display, such as the way density CAD markers will appear on the display (e.g., as triangles rather than circles). The look and feel of the rendered CAD display is often unique to the particular manufacturer of the primary CAD algorithm, and often represents an important clinical expectation on the part of radiologists who view of the rendered display. Accordingly, these aspects are best left undisturbed by the addition of the auxiliary algorithm and voting process. According to another preferred embodiment, the undisturbed aspects of the first DICOM Mammography CAD SR-IOI include complementary CAD data made available by the manufacturer of the primary CAD system, such as various "bonus" features that bear information that can be useful to the radiologist, but that is not mandatory. The complementary CAD data is usually conceived and formatted by the manufacturer of the primary CAD system in cooperation with the manufacturer of the review workstation so that it can be properly rendered and displayed. One example of such complementary CAD data relates to R2 QUANTRA™, a volumetric breast density assessment tool provided by Hologic, Inc., a leading CAD system provider, in selected x-ray mammography CAD packages. By leaving such complementary CAD data undisturbed, the clinical and commercial expectations of the several participants (primary CAD system manufacturer, review workstation manufacturer, clinic/hospital/host of the x-ray mammography environment, radiologists, etc.) remain undisturbed despite the addition of the ACPV unit to the clinical workflow.

After being created by the ACPV unit, the second DICOM Mammography CAD SR-IOI is then transferred to the review workstation, where the CAD-computed information therein is rendered for display in conjunction with the associated underlying x-ray mammogram image(s). Advantageously, except for a very minor step of changing an outbound routing IP address of the primary CAD system from the IP address of the review workstation to the IP address of the ACPV unit (or a similarly minor routing change if intermediate nodes such as PACS archives are involved), there is no requirement to change or replace any of the programming of the either the primary CAD system or the review workstation when the ACPV unit is installed in the x-ray mammography environment. The simplicity and seamlessness of the process relative to the existing CAD infrastructure offers many exciting possibilities for the evaluation and comparison of new CAD algorithms and new voting methods, and at the same time involves minimal downside in terms of the transition efforts that could otherwise be associated with such an important paradigm shift. In addition to the technical and scientific possibilities, there is also provided a rich variety of commercial possibilities, even up to and including a brand new market niche for a standalone ACPV units that can be supplied by new vendors that are entirely new and independent to the medical imaging market. Various further aspects of one or more preferred embodiments can be further understood with respect to the attached drawings and the further detailed description provided hereinbelow.

FIG. 1 illustrates a conceptual diagram of a medical imaging environment 100 for which transition from a "single CAD algorithm" environment to a "multiple CAD algorithm and voting" environment according to the one or more of the preferred embodiments is particularly suited. Shown in FIG. 1 is a network 116, which may be a HIS/RIS (Hospital Information System/Radiology Information System) network, to which is coupled a digital x-ray mammogram acquisition device 102, a film x-ray mammogram acquisition device 104, a breast x-ray tomosynthesis acquisition device 106, and an other medical imaging modality acquisition device 110. In accordance with the "breast x-ray tomosynthesis acquisition device 106" and "other medical imaging modality acquisition device 110" in FIG. 1, it is to be appreciated that the scope of the present teachings encompasses a variety of CAD environments built around various present or prospective medical imaging modalities including, but not limited to, CT, MRI, PET, SPECT, ultrasound, x-ray tomosynthesis, thermography, and electrical conductivity-based modalities, for a variety of different body parts including, but not limited to, the head, the neck, the chest, and the abdomen. Although the preferred embodiments are applicable to such other imaging modalities, the description herein relates to the particular context of x-ray mammography. Film x-ray mammograms 114 acquired by film x-ray mammogram acquisition device 104 are converted into digital form by a digitizer 115 after which, for purposes of the present disclosure, they are treated in a manner similar to digital x-ray mammograms acquired by digital x-ray mammogram acquisition device 102. Preferably, the various medical images and information are communicated according to the DICOM (Digital Imaging and Communications in Medicine) standard and the network 110 supports the TCP/IP protocol, which is used as the transport protocol for the DICOM standard.

A primary CAD system 112, which is programmed with a primary CAD algorithm (CAD Algorithm 1), is coupled to the network 116 and receives a digital x-ray mammogram, usually in the form of plural DICOM Source Image Information Object Instances (SI-IOIs), one for each of the one or more mammogram image views making up an x-ray mammogram case, from the appropriate acquisition device. The primary CAD system 112 processes the received digital x-ray mammogram according to the primary CAD algorithm and encodes the findings into a DICOM Mammography CAD Structured Report Information Object Instance (CAD SR-IOI) 130. The DICOM Mammography CAD SR-IOI 130 is then transferred to a review workstation 120, which also receives the associated underlying x-ray mammogram image(s) by the same or separate communication channels. The review workstation 120 comprises diagnostic displays 122a and 122b, an administrative display 124, user input devices 126 (e.g., keyboard, mouse, trackball, pointers, etc), and a user interface processor 128. The review workstation 120 extracts the CAD-computed information from the DICOM Mammography CAD SR-IOI 130 and renders it for display in conjunction with the underlying x-ray mammogram image(s). For any particular finding that qualifies to merit the radiologist's attention according to the CAD algorithm and the particular FROC operating point selected by the user (if applicable), the relevant CAD information is rendered onto the display in the form of visible annotation markers 132, one marker for each finding, such as a triangle marker 132a for a suspicious microcalcification cluster and an asterisk 132b for a suspicious spiculated mass.

FIG. 1 also illustrates a PACS (Picture Archiving and Communication System) archive 118. The PACS archive 118 generally represents a repository for medical information associated with the medical imaging environment 100, including both current and archived images, current and archived CAD results, radiology reports for completed cases, and so forth. Depending on local clinical workflow and practices, the PACS archive 118 may represent an intermediate and/or duplicate destination during the transfer of digital x-ray mammogram data and/or DICOM Mammography CAD SR-IOIs from one node to the other. Except for the possibility that it may represent such intermediate and/or duplicate destination, the PACS archive 118 has little effect for purposes of the present description unless noted otherwise herein.

Figure 2:
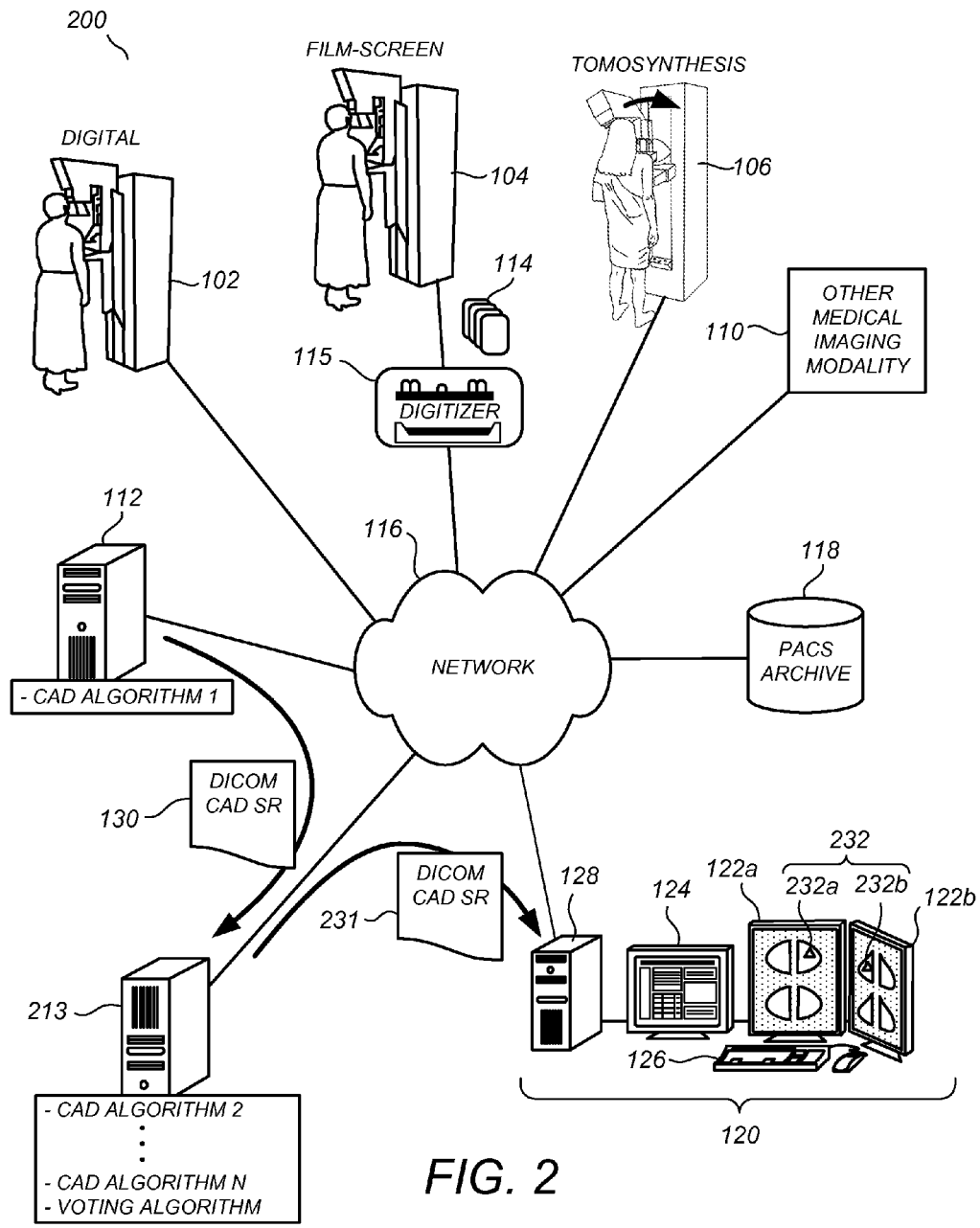
FIG. 2 illustrates a conceptual diagram of a medical imaging CAD environment into which is inserted an auxiliary CAD processing and voting unit according to a preferred embodiment.

FIG. 2 illustrates a conceptual diagram of a medical imaging environment 200, comprising generally the medical imaging environment 100 of FIG. 1, supra, as modified and improved with an auxiliary CAD processing and voting unit (ACPV unit) 213 according to a preferred embodiment. The primary CAD system 112 processes an x-ray mammogram according to the primary CAD algorithm (CAD Algorithm 1) to generate a primary set of CAD findings, which are integrated into the DICOM Mammography CAD SR-IOI 130. The ACPV unit 213 is positioned in the network 116 and otherwise configured so as to receive the same x-ray mammogram as the primary CAD system 112, and to process that x-ray mammogram according to each of one or more auxiliary CAD algorithms (CAD Algorithm 2 to CAD Algorithm N, N≥2), each auxiliary CAD algorithm being independent of the other and independent of the primary CAD algorithm, to generate one or more auxiliary sets of CAD findings.

The ACPV unit 213 extracts the primary set of CAD findings from the DICOM Mammography CAD SR-IOI 130, and translates the primary set of CAD findings and each auxiliary set of CAD findings into a format sufficiently common so that a voting algorithm can be applied to the multiple sets of CAD findings. The ACPV unit 213 then applies a voting algorithm to the multiple sets of CAD findings and generates therefrom a single, final set of voted CAD findings. Any of a variety of different voting algorithms can be used, including one or more algorithms described in US 2009/0136113A1, supra, US 2009/0129656A1, supra, or U.S. Pat. No. 6,067,372, supra. The ACPV unit 213 then generates a DICOM Mammography CAD SR-IOI 231 that essentially copies the DICOM Mammography CAD SR-IOI 130, except that the voted set of CAD findings is substituted in place of the primary set of CAD findings. The review workstation 120 receives the DICOM Mammography CAD SR-IOI 231 and renders the CAD information therein according to the voted set of CAD findings to result in a set 232 of annotation markers 232a-b that, depending on the voting results, can differ from the set of annotation markers 132 of FIG. 1.

The DICOM standard (Digital Imaging and Communications in Medicine) is maintained and extended by the DICOM Standards Committee, an international multi-specialty committee within the National Electrical Manufacturers Association. Currently, the DICOM standard consists of sixteen published parts, PS 3.1-2008 through PS 3.18-2008 (parts PS 3.8 and PS 3.13 being retired) describing different aspects of the DICOM standard. By way of example, the first published part is a 21-page document that can be fully cited as "National Electrical Manufacturers Association, Digital Imaging and Communications in Medicine (DICOM), PS 3.1-2008 Part1: Introduction and Overview, (NEMA 2008)." This document can more briefly be cited as "PS 3.1-2008: Introduction and Overview," "PS 3.1-2008," or, most simply, "PS 3.1," it being understood that the latter is a reference to the current year, a past year, or a group of years according to the context. Among other published parts of the DICOM standard are the third part, "PS 3.3-2003: Information Object Definitions," the fourth part, "PS 3.4-2003: Service Class Specifications," the sixth part, "PS 3.6-2003: Data Dictionary," and the sixteenth part, "PS 3.16-2003: Content Mapping Resource," each of which is incorporated by reference herein.

Additions to the DICOM standard have been made on a continuing basis to accommodate the field of CAD. Among other CAD-related additions to the DICOM standard are additional Information Object Definitions (IODs), including the Mammography CAD Structured Report (SR) IOD (PS 3.3, Annex A.35.5). Instances of the Mammography CAD SR IOD is used to convey the detection and analysis results of mammography CAD systems. The content may include textual and a variety of coded information, numeric measurement values, references to the image data from which the CAD results were obtained, and spatial regions of interest within that referenced image data. The Mammography CAD SR IOD accommodates data not only for presentation to the clinician, but also data that may be solely for use in subsequent mammography CAD analyses.

The contents and formatting of instances of the Mammography CAD SR IOD are constrained according to CAD-related additions to PS 3.16 in the form of templates, and context groups for the coded terminology. For example, the Mammography CAD SR IOD is constructed according to the Template ID (TID) 4000—Mammography CAD Document Root Template which, in turn, can implicate subordinate templates as needed, the subordinate templates including, for example, TID 4001—Mammography CAD Overall Impression/Recommendation Template, TID 4004—Mammography CAD Composite Feature Template, TID 4006—Mammography CAD Single Image Finding Template, TID 4009-Mammography CAD Individual Calcification Template, TID 4010—Mammography CAD Calcification Cluster Template, TID 4011—Mammography CAD Density Template, TID 4011—Mammography CAD Density Template, and TID 4021—Mammography CAD Geometry Template. Further information on the Mammography CAD SR IOD is provided in PS 3.3 at Annex L.

Other additions to the DICOM standard made to accommodate CAD include the addition of specified Service-Object Pair (SOP) Classes. As known in the art, a SOP Class is a union of a specific set of DICOM Message Service Elements (DIMSEs) and a related IOD which completely defines a precise context for communication. For accommodation of mammography CAD, there is a Structured Reporting Storage SOP Class—the Mammography CAD SR SOP Class—instances of which transfer Mammography CAD SR Object Instances from one device to another. (PS 3.4, Annexes B.5, O). There is also an additional Structured Reporting Media Storage SOP Class for the Mammography CAD SR IOD, instances of which are for the interchange and offline storage of Mammography CAD SR Object Instances and Chest CAD SR Object Instances, respectively (PS 3.4, Annex I). Finally, there are also additional SOP Class Unique Identifiers (UIDs) for the additional SOP Classes (PS 3.6, Annex A).

For clarity of presentation in the present disclosure, where convenient, an information object (IO) or information object instance (IOI) shall be referred to independently of the SOP Class or SOP Instance of which they may be a part. The formation or presence of the appropriate SOP Class or SOP Instance can be inferred from the identity of the IO or IOI being described, together with the action being taken and/or the descriptive context. Also for clarity of presentation herein, where convenient, treatment of IOs or IOIs is without regard to their classification as normalized or composite, it being understood that their appropriate type, as well as the appropriate corresponding DIMSEs, SOP Classes, SOP Instances, etc., can be likewise inferred. As would be readily appreciated by a person skilled in the art, the DICOM standard is subject to various changes, improvements, migrations, etc., on a continuing basis over time. Therefore certain of the particular DICOM-related terminology described herein, and/or certain of the particular DICOM codes described herein, may require comparison with, and/or certain upgrades/modifications according to, the most recent DICOM standard publications available, with it being understood that the resultant implementations would nevertheless remain within the scope of the present teachings.

Figure 3:
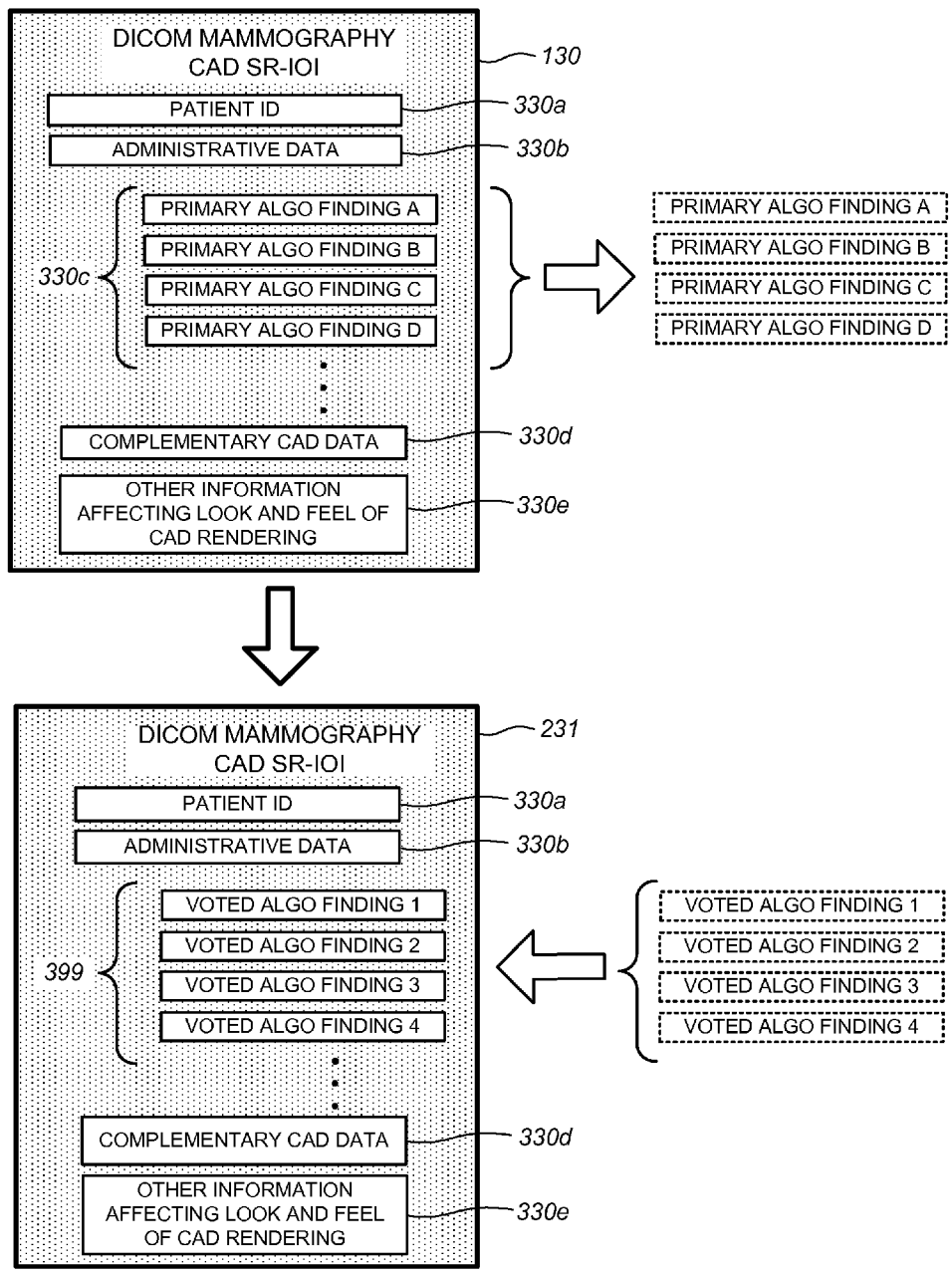
FIG. 3 illustrates conceptual block diagrams of a first DICOM CAD report generated by a primary CAD processing unit and a second DICOM CAD report generated by the auxiliary CAD processing and voting unit of FIG. 2 according to a preferred embodiment.

FIG. 3 illustrates a conceptual block diagram of the DICOM Mammography CAD SR-IOIs 130 and 231 that are illustrated iconically in FIG. 2, supra. As output from the primary CAD system 112, the DICOM Mammography CAD SR-IOI 130 includes patient ID data 330a, other administrative data 330b, a primary set of CAD findings 330c, complementary CAD data 330d (such as data underlying the R2 QUANTRA™ breast volume density assessment tool, supra) and other information 330e affecting the look and feel of the CAD rendering. According to a preferred embodiment, as output from the ACPV unit 213, the DICOM Mammography CAD SR-IOI 231 consists essentially of the same data elements 330a, 330b, 330d, and 330e in unchanged form, while the primary set of CAD findings 330c are replaced by a voted set of CAD findings 399. Advantageously, the review workstation 120, which is "none the wiser" to the "result switch" that has taken place, will render the voted CAD results in a manner that maintains the same look and feel as if the primary CAD system 112 had transferred its DICOM Mammography CAD SR-IOI directly thereto, maintaining, for example, the way density CAD markers will appear on the display (e.g., as triangles rather than circles), the particular various ways the patient data is displayed, and rendering the complementary CAD data in familiar fashion.

As used herein, a "finding" refers to a particular potentially suspicious lesion in a medical image as identified by a CAD process, and the term "finding" encompasses information representative of the identification of that potentially suspicious lesion by the CAD process. A finding is a "marked finding" if its computed characteristics are adjudged by the CAD process to merit the attention of the radiologist, and is an "unmarked finding" otherwise. As known in the art, although a DICOM Mammography CAD SR-IOI contains underlying information based upon which a "marked" versus "unmarked" status of a finding can be determined, the DICOM Mammography CAD SR-IOI itself is not necessarily the carrier of the conclusion itself, because that conclusion may depend on a user-selected FROC curve operating point of the review workstation 120. On the other hand, the DICOM specification does permit the primary CAD system 112 to preordain a finding as a "marked finding" regardless of the operating point of the review workstation 120. For DICOM Mammography CAD SR-IOIs, the primary CAD system 112 can include a DCM code 111056 ("Rendering intent") of "Presentation Required" to require that finding to be marked on the user display, whereas it can include the DCM code 111056 "Presentation Optional" to permit the marking status of that finding to be subject to the FROC curve operating point, such as by its particular value DCM code 111047. For findings that are not pre-ordained as "Presentation Required,"

a DCM code 111047 ("Probability of cancer") included in the DICOM Mammography CAD SR-IOI can be used as a basis for the determination of "marked finding" versus "unmarked finding" by the review workstation 120.

According to a preferred embodiment, all of the findings in the DICOM Mammography CAD SR-IOI 130 are extracted and used in the voting process, regardless of the particular value of their DCM code 111047, and regardless of their DCM code 111056 rendering intent status as "Presentation Required" or "Presentation Optional." Moreover, depending on the results of the voting, the ACPV unit 213 could demote a particular finding from a DCM code 111056 "Presentation Required" status to a DCM code 111056 "Presentation Optional" status, or vice-versa, in the output DICOM Mammography CAD SR-IOI 231.

As previously discussed, in order for the ACPV unit 213 to carry out the voting process, it must first the translate the primary set of CAD findings and each auxiliary set of CAD findings into a format sufficiently common so that a voting algorithm can be applied to the multiple sets of CAD findings. This can be achieved in a variety of different ways without departing from the scope of the preferred embodiments. One relatively direct method is to parse out each finding in the DICOM Mammography CAD SR-IOI 130 (and from any auxiliary CAD result set that may be expressed in as a DICOM Mammography CAD SR-IOI) using DCM code 111059 (Single Image Finding) or DCM code 111015 (Composite Feature), and then once parsed, determining the X-Y coordinates of the lesion center based on its DCM code 111010 value (Center, see PS 3.16, TID 4021. Mammography CAD Geometry Template). The X-Y coordinates of the findings can then be used as a basis for correlating associated findings from the other sets of CAD results, such that each finding can be voted on. Another method, which can be combined to varying extents with the point-based method, is to extract the geometric outline of each finding in the DICOM Mammography CAD SR-IOI using its DCM code 111041 value (Outline, see PS 3.16, TID 4021 Mammography CAD Geometry Template), the outline being expressed as a linked chain of X-Y coordinates in the DICOM Mammography CAD SR-IOI. The outlines of the findings and/or their center locations can be used as a basis for correlation with the other sets of CAD results based on spatial overlap, proximity, or other spatial correlation metrics, so that an ultimate voting process can take place. As would be readily appreciated by a person skilled in the art, three-dimensional coordinates (X-Y-Z) for lesion centers, outlines, etc., would be used as a basis for correlating associated findings for x-ray tomosynthesis or other three-dimensional medical imaging modalities, and would likewise be available and identifiable in the DICOM CAD SR-IOI(s) associated therewith.

Notably, the medical imaging environment of FIG. 2 supra is presented by way of example only and is not intended to limit the scope of the preferred embodiments to this particular scenario. By way of example, different combinations of the devices of FIG. 2 can be placed adjacently to each other or integrated into the same hardware boxes without departing from the scope of the preferred embodiments. By way of still further example, the network 116 can be a wide-area network with the different nodes being distributed throughout a city, a country, or the world. Alternatively, and by way of still further example, some or all of the transfer of digital information can be achieved by physical transfer of disks, memory sticks, or other digital media devices without departing from the scope of the preferred embodiments. In view of the present disclosure, a person skilled in the art would be able to construct the described hardware, software, user interface, and networking configurations without undue experimentation, using publicly available devices, programming tools, and software development platforms.

Figure 4:
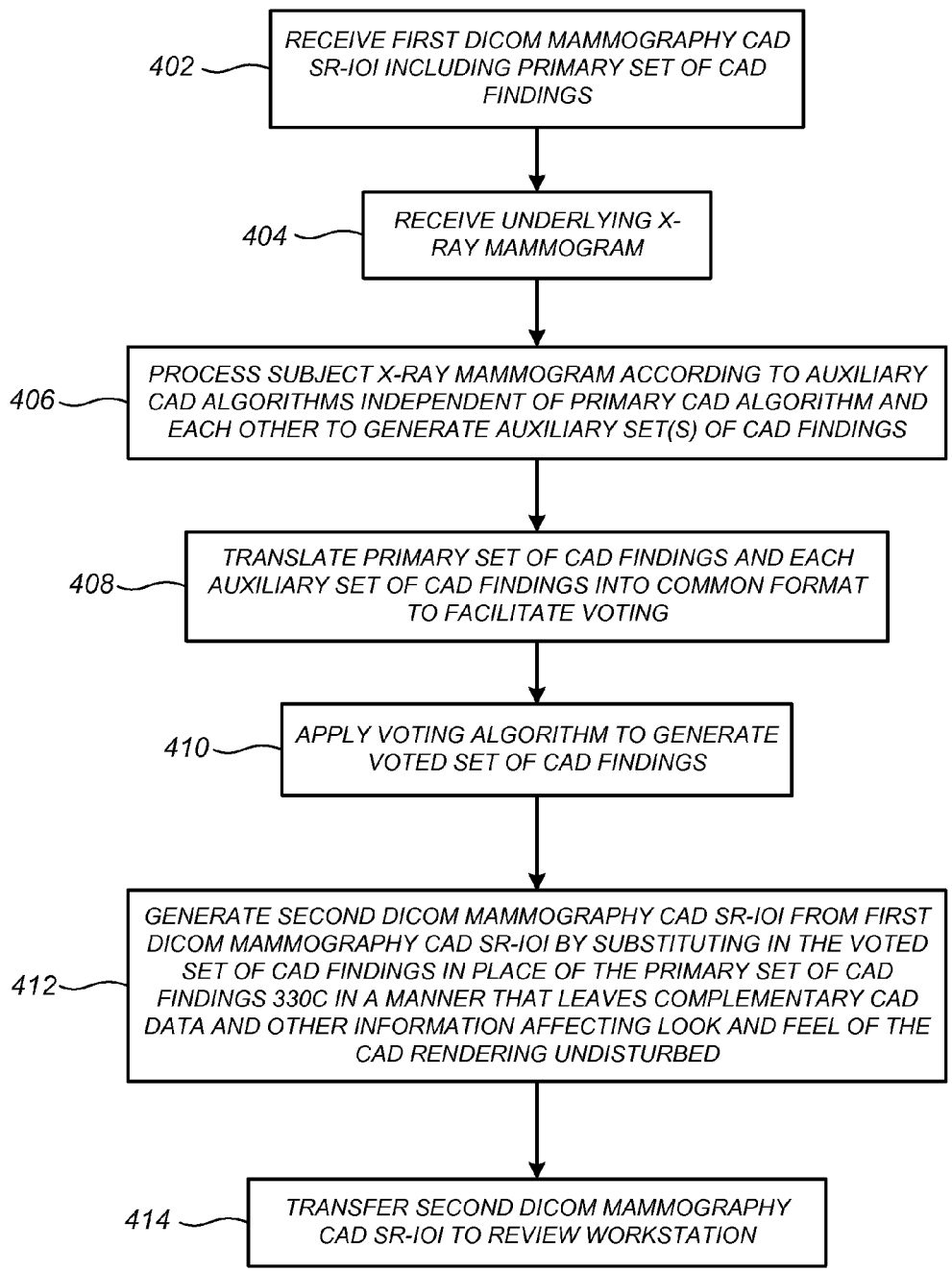
FIG. 4 illustrates facilitating CAD detection of anatomical abnormalities in a medical image according to a preferred embodiment.

FIG. 4 illustrates auxiliary CAD processing and voting according to a preferred embodiment as carried out by the ACPV unit 213 of FIG. 2, supra, steps which can be further understood in relation to FIG. 2 and FIG. 3, supra. At step 402, the first DICOM Mammography CAD SR-IOI 130 as it was generated by the primary CAD system 112 is received. Included in the first DICOM Mammography CAD SR-IOI 130 in step 408 is the primary set of CAD findings 330c (see FIG. 3), as well as patient ID data 330a, other administrative data 330b, complementary CAD data 330d, and other information 330e affecting the look and feel of the CAD rendering. At step 404, the underlying x-ray mammogram that is the subject of the first DICOM Mammography CAD SR-IOI 130, and which usually takes the form of plural DICOM SI-IOIs (one for each x-ray mammogram image view) is received. Step 404 can occur before, concurrently, or after step 402. The subject x-ray mammogram can be received directly from the digital mammogram acquisition device or from the PACS archive 118, or alternatively can be forwarded from the primary CAD system 112 concurrently with the first DICOM Mammography CAD SR-IOI 130 or at a different point in time as the first DICOM Mammography CAD SR-IOI 130.

At step 406, the ACPV unit 213 processes the subject x-ray mammogram according to each of the auxiliary CAD algorithms (CAD Algorithm 2 to CAD Algorithm N, N≥2), each auxiliary CAD algorithm being independent of the other and independent of the primary CAD algorithm, to generate one or more auxiliary sets of CAD findings. At step 408, the primary set of CAD findings and each auxiliary set of CAD findings are translated into a format sufficiently common so that a voting algorithm can be applied, using one or more of the methods (e.g., lesion center based spatial correlation, lesion outline-based spatial correlation, etc.) described supra. For one preferred embodiment, the common format into which the multiple sets of CAD findings is translated is DICOM-based, while in another preferred embodiment the common format is a custom or proprietary format associated with the ACPV unit 213, or some other non-DICOM format. At step 410, a voting algorithm is applied to generate a voted set of CAD findings 399 (see FIG. 3).

At step 412, the second DICOM Mammography CAD SR-IOI 231 is created by substituting in the voted set of CAD findings 399 in place of the primary set of CAD findings 330c, such that the various other information that was included in the first DICOM Mammography CAD SR-IOI 130, including complementary CAD data 330d and the other information 330e affecting the look and feel of the CAD rendering, remains undisturbed. While keeping the complementary CAD data 330d and look-and-feel affecting data 330e undisturbed, it is preferable at step 412 that the second DICOM Mammography CAD SR-IOI 231 be encoded, using the appropriate DICOM coding, with the voted set of CAD findings 399 in a manner that appropriately identifies their source as the ACPV unit 213 rather than the first CAD system 112, such that the DICOM standard itself is not violated by virtue of the substitution of findings. Finally, at step 414, the second DICOM Mammography CAD SR-IOI 231 is transferred to the review workstation 120.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, as used hereinabove, the term voting encompasses not only various logical combination and threshold schemes, weighted combination and threshold schemes, and the like, but further includes any of a variety of different statistical process in which the results from any two CAD algorithms are somehow compared or processed to produce a result that is at least partially influenced by each of them.

By way of further example, although the ACPV unit described in one or more preferred embodiments supra as being particularly preferable when provided as a standalone, network-attachable piece of hardware or group of hardware boxes, it is not outside the scope of the preferred embodiments for the functionalities of the ACPV unit to be appended onto the primary CAD system box, or the review workstation box, or to be split among the primary CAD system box (e.g., append just the auxiliary CAD algorithms) and the review workstation box (e.g., append just the voting algorithm), although such possibilities are not quite as advantageous from a transition seamlessness perspective. By way of still further example, although the ACPV unit described supra is particularly preferable when provided as a DICOM-compliant device that receives DICOM CAD SR-IOIs from a primary CAD system and supplies modified DICOM CAD SR-IOIs to a review workstation, the scope of the present teachings is not so limited and readily extends to non-DICOM CAD reporting environments. For example, in one alternative preferred embodiment, the ACPV unit is configured to receive custom or proprietarily formatted CAD reports from the primary CAD system and to supply modified versions of those custom or proprietarily formatted CAD reports to the review workstation.

By way of even further example, in other alternative preferred embodiments, the ACPV unit is configured to receive custom or proprietarily formatted CAD reports from the primary CAD system and to supply DICOM-compliant DICOM CAD SR-IOIs to the review workstation. In yet other alternative preferred embodiment, the ACPV unit is configured to receive DICOM-compliant DICOM CAD SR-IOIs from the primary CAD system and to supply custom or proprietarily formatted CAD reports to the review workstation. Therefore, reference to the details of the preferred embodiments are not intended to limit their scope, which is limited only by the scope of the claims set forth below.

What is claimed is:

1. A method for computer-aided detection (CAD) of anatomical abnormalities in x-ray mammograms based on modification of a preexisting x-ray mammography CAD environment, the preexisting x-ray mammography CAD environment including (i) a primary CAD processing system programmed to apply a primary CAD algorithm to x-ray mammograms to generate DICOM Mammography CAD Structured Report Information Object Instances (SR-IOIs) associated therewith, and (ii) a review workstation configured to receive the DICOM Mammography CAD SR-IOIs and render their contents for display in conjunction with the associated x-ray mammograms, the method comprising:
    receiving a first x-ray mammogram at an auxiliary system, the auxiliary system being installed within a preexisting x-ray mammography CAD environment and being a separate hardware processing unit in operative data communication with and between the primary CAD processing system and the review workstation, the auxiliary system comprising at least one processor utilized to execute (i) at least one auxiliary CAD algorithm that is independent of the primary CAD algorithm, and (ii) a CAD voting algorithm;

the auxiliary system receiving a first DICOM Mammography CAD SR-IOI incorporating a primary set of CAD findings generated by the primary CAD processing system based upon application of the primary CAD algorithm to the first x-ray mammogram;

the auxiliary system processing the first x-ray mammogram according to the at least one auxiliary CAD algorithm to respectively generate at least one auxiliary set of CAD findings;

the auxiliary system processing the primary set of CAD findings in conjunction with the at least one auxiliary set of CAD findings according to the CAD voting algorithm to generate a voted set of CAD findings;

the auxiliary system generating a second DICOM Mammography CAD SR-IOI incorporating the voted set of CAD findings; and the auxiliary system transmitting the second DICOM Mammography CAD SR-IOI to the review workstation, the second DICOM Mammography CAD SR-IOI for rendering by the review station of the contents of the second DICOM Mammography CAD SR-IOI for display in conjunction with the first x-ray mammogram.

2. The method of claim 1, wherein the second DICOM Mammography CAD SR-IOI is substantially identical to the first DICOM Mammography CAD SR-IOI except that the voted set of CAD findings is substituted in place of the primary set of CAD findings.

3. The method of claim 1, wherein the first DICOM Mammography CAD SR-IOI includes complementary CAD data generated by application of the primary CAD algorithm to the first x-ray mammogram, the complementary CAD data characterizing the first x-ray mammogram by computed assessments other than the primary set of CAD findings, and wherein the second DICOM Mammography CAD SR-IOI comprises the complementary CAD data from the first DICOM Mammography CAD SR-IOI therein in substantially unaltered form.

4. The method of claim 1, wherein the first DICOM Mammography CAD SR-IOI includes first information that would be determinative of how a graphical user interface is rendered by the review workstation in conjunction with the first mammogram, and wherein the second DICOM Mammography CAD SR-IOI comprises the first information from the first DICOM Mammography CAD SR-IOI therein in substantially unaltered form.

5. The method of claim 1, the auxiliary system executing at least two auxiliary CAD algorithms, wherein each of the auxiliary CAD algorithms is independent of each other auxiliary CAD algorithm and is independent of the primary CAD algorithm.

6. The method of claim 1, wherein the auxiliary system is installed into the preexisting x-ray mammography CAD environment as a single hardware processing unit including the at least one processor.

7. The method of claim 1, the second DICOM Mammography CAD SR-IOI being processed to result in a rendering by the review workstation substantially similar to a rendering that would result from the first DICOM Mammography CAD SR-IOI except that the voted set of CAD findings are substituted in place of the primary set of CAD findings.

8. A method for computer-aided detection (CAD) of anatomical abnormalities in medical images based on a modification of a preexisting CAD environment, the preexisting CAD environment including (i) a primary CAD processing system programmed to apply a primary CAD algorithm to medical images to generate CAD reports of a preexisting format, and (ii) a review workstation configured to receive the CAD reports of a preexisting format and render their contents for display in conjunction with the associated medical images, the method comprising:

receiving a first medical image at an auxiliary system, the auxiliary system being installed within a preexisting CAD environment and being a separate hardware processing unit in operative data communication with and between the primary CAD processing system and the review workstation, the auxiliary system comprising at least one processor utilized to execute (i) at least one auxiliary CAD algorithm that is independent of the primary CAD algorithm, and (ii) a CAD voting algorithm;

the auxiliary system receiving a first CAD reports of a preexisting format, the first CAD report incorporating a primary set of CAD findings generated by the primary CAD processing system based upon application of the primary CAD algorithm to the first medical image;

the auxiliary system processing the first medical image according to the at least one auxiliary CAD algorithm to respectively generate at least one auxiliary set of CAD findings;

the auxiliary system processing the primary set of CAD findings in conjunction with the at least one auxiliary set of CAD findings according to the CAD voting algorithm to generate a voted set of CAD findings;

the auxiliary system generating a second CAD reports of a preexisting format such that a result of rendering the second CAD report by the review workstation is substantially similar to a rendering that would result from the first CAD report except that the voted set of CAD findings are substituted in place of the primary set of CAD findings; and the auxiliary system transmitting the second CAD report to the review workstation, for rendering by the review station of the contents for display in conjunction with the first medical image.

9. The method of claim 8, the auxiliary system executing at least two auxiliary CAD algorithms, wherein each of the auxiliary CAD algorithms is independent of each other auxiliary CAD algorithm and is independent of the primary CAD algorithm.

10. The method of claim 8, wherein the auxiliary system is installed into the preexisting CAD environment as a single hardware processing unit.

11. The method of claim 8, wherein the preexisting CAD environment is a DICOM-compliant x-ray mammography CAD environment, and wherein the preexisting format corresponds to that of a DICOM Mammography CAD Structured Report Information Object Instance (SR-IOI).

12. An apparatus for facilitating computer aided detection (CAD) of anatomical abnormalities in medical images in a CAD environment, the CAD environment including (i) a primary CAD processing system programmed to apply a primary CAD algorithm to medical images to generate CAD reports of a preexisting format, and (ii) a review workstation configured to receive the CAD reports of the preexisting format and render their contents for display in conjunction with the associated medical images, comprising:

an auxiliary CAD system, being a separate hardware processing unit in operative data communication with and between the primary CAD processing system and the review workstation, comprising at least one processor programmed and configured to receive and process a first medical image according to at least one auxiliary CAD algorithm substantially independent of the primary CAD algorithm to respectively generate at least one auxiliary set of CAD findings;

a voting algorithm, the processor being configured to execute the voting algorithm to (i) receive a first CAD report having the preexisting format, the first CAD report incorporating a primary set of CAD findings generated by the primary CAD processing system based upon application of the primary CAD algorithm to the first medical image, and (ii) process the primary set of CAD findings in conjunction with the at least one auxiliary set of CAD findings according to a CAD voting algorithm to generate a voted set of CAD findings; and a translation processor in operative data communication with the processor and the review workstation, wherein the translation processor is configured to (i) receive the first CAD report and the voted set of CAD results and to generate therefrom a second CAD report having the preexisting format, the second CAD report being configured to result in a rendering by the review workstation highly similar to a rendering that would result from the first CAD report except that the voted set of CAD findings are substituted in place of the primary set of CAD findings, and (ii) provide the second CAD report for rendering at the review workstation in conjunction with the first medical image.

13. The apparatus of claim 12, wherein the auxiliary CAD processor is programmed to execute at least two auxiliary CAD algorithms, and wherein each of the auxiliary CAD algorithms is independent of each other auxiliary CAD algorithm and is independent of the primary CAD algorithm.

14. The apparatus of claim 12, wherein the auxiliary CAD processor, voting algorithm, and translation processor are incorporated into single hardware processing unit.

15. The apparatus of claim 14, wherein the CAD environment is a preexisting CAD environment including a preexisting CAD processing system and a preexisting review workstation, and wherein the single hardware processing unit is configured for addition to the preexisting CAD environment by establishment of a networked connection with the preexisting CAD processing system the preexisting review workstation.

16. The apparatus of claim 15, wherein the preexisting CAD environment is a DICOM-compliant x-ray mammography CAD environment, and wherein the preexisting format corresponds to that of a DICOM Mammography CAD Structured Report Information Object Instance (SR-IOI).

17. A non-transitory computer readable medium tangibly embodying one or more sequences of instructions wherein execution of the one or more sequences of instructions by one or more processors causes the one or more processors to facilitate computer aided detection (CAD) of anatomical abnormalities in medical images in a CAD environment, the CAD environment including (i) a primary CAD processing system programmed to apply a primary CAD algorithm to medical images to generate CAD reports of a preexisting format, and (ii) a review workstation configured to receive the CAD reports of the preexisting format and render their contents for display in conjunction with the associated medical images, according to the steps of:

receiving a first medical image at an auxiliary system installed within a preexisting CAD environment and being a separate hardware processing unit in operative data communication with and between the primary CAD processing system and the review workstation;

processing the first medical image according to at least one auxiliary CAD algorithm substantially independent of the primary CAD algorithm to respectively generate at least one auxiliary set of CAD findings;

receiving a first CAD report having the preexisting format, the first CAD report incorporating a primary set of CAD findings generated by the primary CAD processing system based upon application of the primary CAD algorithm to the first medical image;

processing the primary set of CAD findings in conjunction with the at least one auxiliary set of CAD findings according to a CAD voting algorithm to generate a voted set of CAD findings;

generating a second CAD report having the preexisting format, the second CAD report being configured to result in a rendering by the review workstation highly similar to a rendering that would result from the first CAD report except that the voted set of CAD findings are substituted in place of the primary set of CAD findings; and providing the second CAD report for rendering at the review workstation in conjunction with the first medical image.

18. The computer readable medium of claim 17, wherein the at least one auxiliary CAD algorithm includes a plurality of auxiliary CAD algorithms, each auxiliary CAD algorithm being independent of the other and independent of the primary CAD algorithm.

19. The computer readable medium of claim 17, wherein the CAD environment is a DICOM-compliant x-ray mammography CAD environment, and wherein the preexisting format corresponds to that of a DICOM Mammography CAD Structured Report Information Object Instance (SR-IOI), whereby the first and second CAD reports are first and second DICOM Mammography CAD SR-IOIs, respectively.

20. The computer readable medium of claim 19, wherein the second DICOM Mammography CAD SR-IOI is substantially identical to the first DICOM Mammography CAD SR-IOI except that the voted set of CAD findings is substituted in place of the primary set of CAD findings.

* * * * *